United States Patent [19]

Stanczak, Jr.

[11] 4,097,989
[45] Jul. 4, 1978

[54] DYNAMOELECTRIC MACHINE COIL INSERTING APPARATUS

[75] Inventor: Michael Alfred Stanczak, Jr., Fort Wayne, Ind.

[73] Assignee: Essex Group, Inc., Fort Wayne, Ind.

[21] Appl. No.: 800,596

[22] Filed: May 25, 1977

[51] Int. Cl.² .................................................. H02K 15/06
[52] U.S. Cl. .................................................. 29/734; 29/736
[58] Field of Search ................. 29/734, 736, 732, 596, 29/606

[56] References Cited

U.S. PATENT DOCUMENTS 3,968,556 7/1976 Morr .................................... 29/734

Primary Examiner—Carl E. Hall
Attorney, Agent, or Firm—Robert D. Sommer; Lawrence E. Freiburger

[57] ABSTRACT

In short stroke dynamoelectric machine coil and wedge inserting apparatus wherein a plurality of elongated blade elements are detachably retained upon respective wedge guide members for adjustment of the blade elements to accommodate stator core members of different lengths, a longitudinally extending surface portion of each blade element adapted for abutting engagement with a respective wedge guide member has at least one opening formed therein extending obliquely at a predetermined angle relative to the longitudinal axis of the blade element to frictionally receive one end of a retaining pin. Each wedge guide member is provided with a plurality of longitudinally spaced and aligned apertures extending obliquely at the same predetermined angle relative to the longitudinal axis of the wedge guide member to selectively receive with a slip fit the end of a retaining pin projecting from the obliquely extending opening of a respective blade element. The retaining pin extending obliquely through the aligned opening and aperture respectively of a blade element and its associated wedge guide member effectively prevents the accidental separation of the blade element from the wedge guide member.

8 Claims, 2 Drawing Figures

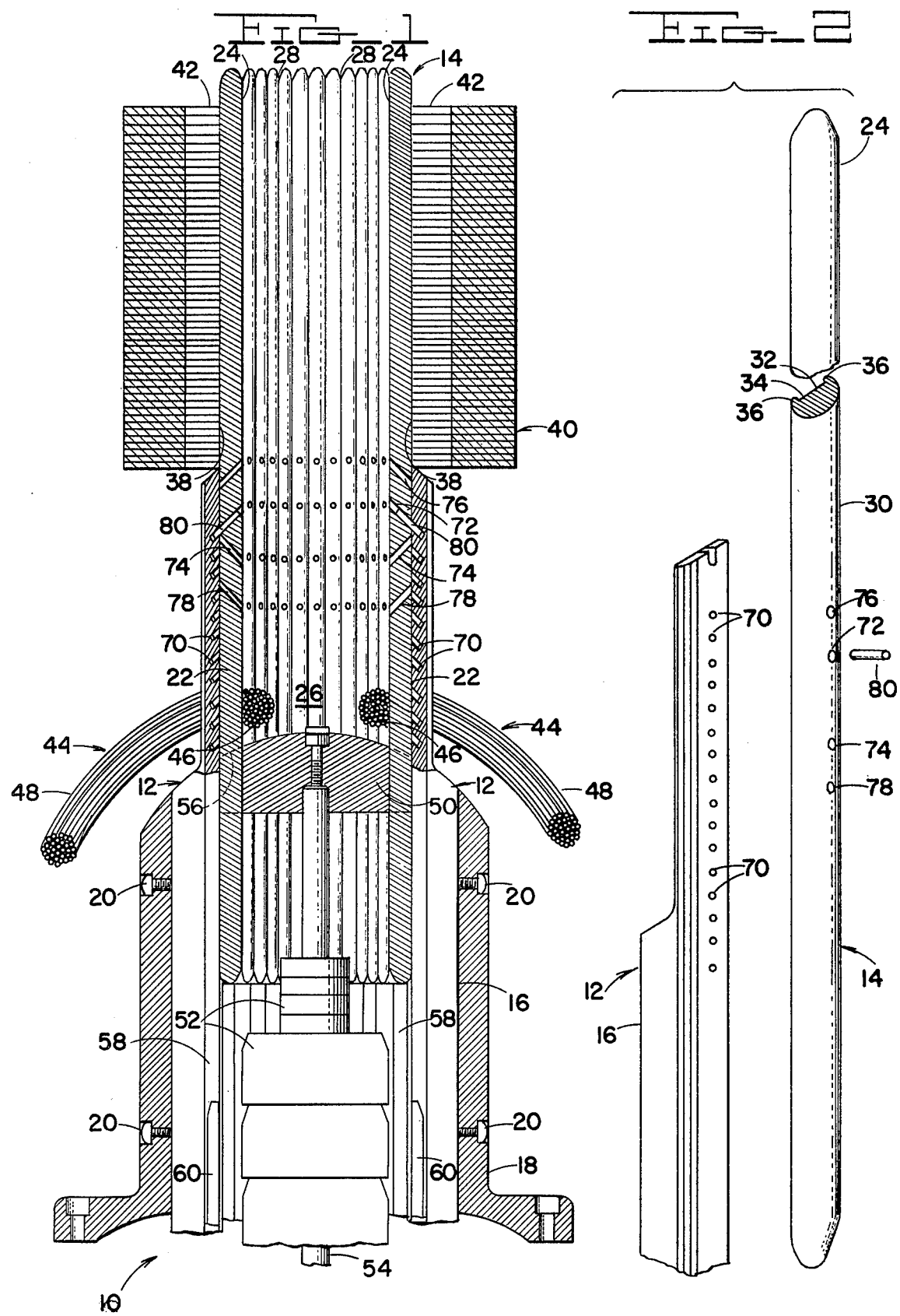

DYNAMOELECTRIC MACHINE COIL INSERTING APPARATUS

BACKGROUND OF THE INVENTION

This invention relates generally to apparatus for inserting prewound coils and slot wedges into the slots of an internally slotted dynamoelectric machine stator core member, and more particularly to an improvement for detachably retaining blade elements respectively in engagement with wedge guide members in such inserting apparatus of the short stroke type.

Apparatus for inserting prewound coils into the slots of a dynamoelectric machine stator core member is shown in the Adamson U.S. Pat. No. 2,432,267 dated Dec. 9, 1947, and coil inserting apparatus which also inserts slot wedges into the slots of a stator core member following insertion of the coils is further shown, for example, in the Hill U.S. Pat. No. 3,324,536 dated June 13, 1967, the Eminger U.S. Pat. No. 3,447,225 dated June 3, 1969, and the Walker U.S. Pat. No. 3,505,721 dated Apr. 14, 1970. In the Morr U.S. Pat. No. 3,872,568 dated Mar. 25, 1975 and the Morr U.S. Pat. No. 3,968,556 dated July 13, 1976, the disclosures of which are incorporated herein by reference, there are disclosed improved short stroke coil and wedge inserting apparatus of the type in which the slot wedges are fed from a magazine to an intermediate position on a first insertion stroke of a reciprocable actuator and from the intermediate position to the stator core member on a second insertion stroke of the actuator. So that the inserting apparatus of the aforesaid Morr U.S. Pat. No. 3,968,556 may be used with stator core members of different lengths, the blade elements of this apparatus are detachably retained upon respective wedge guide members by roll pins each having one end inserted into an opening in a blade element and its other end selectively disposed in one of a plurality of recesses in an associated wedge guide member. In use of such apparatus, the accidental application of a transverse force to the projecting end of a blade element produces a force generally perpendicular to the longitudinal axis of the blade element at the portions of the blade element and wedge guide member secured together by a roll pin. Since the roll pin extends through the aligned opening and recess respectively of the blade element and wedge guide member in a direction also perpendicular to the longitudinal axes of these parts, its frictional engagement with these parts may be insufficient to prevent accidental separation of the blade element from the wedge guide member when the stripper member is in a lowered position disengaged from the blade elements.

SUMMARY OF THE INVENTION

Accordingly, it is a general object of the present invention to provide an improved arrangement for detachably retaining the blade elements in short stroke coil and wedge inserting apparatus which effectively prevents the accidental separation of any blade element from its associated wedge guide yet permits rapid and easy axial adjustment of the blade elements relative to the wedge guide members.

In accordance with the present invention, the blade elements of a short stroke coil and wedge inserting apparatus each have at least one opening formed in a longitudinally extending surface portion intermediate the ends of the blade element and extending obliquely at a predetermined angle relative to the longitudinal axis of the blade element. Each wedge guide member is provided with a plurality of longitudinally spaced and aligned apertures extending obliquely at the same predetermined angle relative to the longitudinal axis of the wedge guide member. Each blade element is detachably retained in abutting engagement with an associated wedge guide member by inserting one end of a retaining pin in the obliquely extending opening of the blade element and inserting the other end of the retaining pin into a selected aperture of the wedge guide member. In a preferred embodiment, the retaining pins are longitudinally split sleeves of spring material elastically constricted when respectively positioned in the obliquely extending openings of the blade elements and the obliquely extending apertures in the wedge guide members are dimensioned to receive the retaining pins with a slip fit. The blade elements may each have two such obliquely extending openings directed in oppositely inclined like angles and spaced at like distances from the respective ends of the blade element to permit an end-to-end reversed mounting of the blade element on an associated wedge guide member.

The above-mentioned and other features and objects of this invention and the manner of attaining them will become more apparent and the invention itself will be best understood by reference to the following description of an embodiment of the invention taken in conjunction with the accompanying drawing.

BRIEF DESCRIPTION OF THE DRAWING

FIG. 1 is a fragmentary side view, partly in cross section and partly broken away, of a portion of a coil and wedge inserting apparatus embodying the invention; and FIG. 2 is a fragmentary exploded view of a slot wedge guide, a blade and a pin fastener employed in the apparatus of FIG. 1.

DESCRIPTION OF THE PREFERRED EMBODIMENT

Referring now to the drawing in greater detail, FIG. 1 illustrates a portion of a coil and wedge inserting apparatus 10 constructed generally in accordance with the teachings of the aforementioned Morr U.S. Pat. No. 3,968,556 to which reference may be had for details of construction and operation not mentioned herein. The apparatus 10 includes a plurality of slot wedge guides 12 and a plurality of elongated, parallel blades 14 each which partially surrounds a portion of a corresponding wedge guide 12. The wedge guides 12 have inner portions 16 attached to a housing member or base 18 by suitable fasteners 20 in a circular arrangement. The blades 14 have rear portions 22 secured to respective wedge guides 12 by means hereinafter described and have forward portions 24 extending axially outwardly from the wedge guides 12. The blades 14 are circularly arranged to define a bore 26 and are radially spaced apart to define axially and radially extending spaces 28 between respective pairs of adjacent blades 14. The blades 14 have a generally tapered cross section and have a rounded or arcuate radially inner surface 30. The radially outer surface 32 of each blade 14 is longitudinally grooved as indicated at 34 to define two spaced apart longitudinally extending projections or lips 36. The grooved outer surface 32 of the forward portions 24 of the blades 14 respectively receive the inner ends of teeth 38 of a stator core 40 in which coils and slot wedges are to be inserted. The axially extending spaces 28 between the blades 14 communicate with the slots 42 of the stator core 40 defined by the teeth 38. Prewound coils 44 to be inserted into the slots 42 of the core 40 are looped about the forward portions 24 of the blades 14 with one end turn 46 of each coil 44 extending through the bore 26 and with the coil sides 48 extending outwardly through the spaces 28 between respective pairs of blades 14. To facilitate insertion of the coils 44 into the spaces 28 and placing of the core 40 upon the blades 14, the ends of the blades 14 may be tapered and rounded as illustrated in the drawing.

A movable stripper 50 is positioned within the blades 14 for reciprocating movement relative to the blades 14 by pushing spacers 52 and a pull rod 54. The stripper 50 has a plurality of projections 56 which respectively extend radially outwardly in the spaces 28 between the fingers 14. Axial movement of the stripper 50 toward the core 40 will move the end turns 46 of coils 44 axially along the rounded surfaces 30 of the blades 14 to progressively insert the coil sides 48 into the respective core slots 42. The portions of the projections 36 on the blades 14 which overlie the core teeth 38 at the entrances to the slots 42 serve to protect the coils 44 from damage by the laminated edges of the teeth 38. If desired, some of the blades 14 rather than being secured to the wedge guides 12 may be rigidly secured to the stripper 50 for reciprocating movement with the stripper 50 between adjacent fixed blades 14.

The slot wedge guides 12 are respectively aligned axially with the blades 14 and define wedge guide passages or slots 58 therebeween in axial and radial alignment with the spaces 28 between the blades 14 and in axial alignment with the core slots 42. Means, such as that disclosed in the aforesaid Morr U.S. Pat. No. 3,968,556, are employed for pushing the slot wedges 60 through the passages 58 into respective core slots 42 and need not be further described and illustrated.

In accordance with the present invention, the fixed blades 14 are attached to the wedge guides 12 in a manner which effectively prevents the accidental separation of any blade 14 from its associated wedge guide 12 yet permits rapid and easy axial adjustment of the blades 14 relative to the wedge guides 12 to accommodate stator cores 40 of different stack heights. In the preferred embodiment of the invention, the forward length of each wedge guide 12 is provided with a plurality of longitudinally spaced and aligned apertures in the form of identical bores 70 which extend from the radially inner surface of the wedge guide 12 obliquely relative to the longitudinal axis of the wedge guide 12. Each bore 70 is inclined at an angle of 45° relative to the longitudinal axis of the wedge guide and the distance between each pair of adjacent bores 70 is identical. Each blade 14 is provided with four longitudinally aligned openings 72, 74, 76 and 78 extending therethrough between the radially inner surface 30 and the radially outer surface 32 obliquely relative to the longitudinal axis of the blade 14. The openings 72 and 74 extend through the blade 14 at oppositely inclined angles of 45° and are spaced at like distances from the respective ends of the blades 14. The openings 76 and 78 also extend through the blade 14 at oppositely inclined angles of 45° but are spaced at lesser like distances from the respective ends of the blade 14 than are the openings 72 and 74. The distance between the openings 72 and 76 as well as the distance between the openings 74 and 78 is preferably one and one-half times the distance between the adjacent bores 70 in the wedge guides 12.

The fastening means for attaching the blades 14 to the wedge guides 12 comprise a plurality of pins or pegs 80, one for each fixed blade 14. A pin 80 is inserted into one of the openings 72, 74, 76 and 78 of a blade 12 to extend outwardly from the outer surface 32 thereof for reception in a bore 70 of the associated wedge guide 12. The pins 80 are preferably roll pins each comprising a longitudinally split sleeve of spring steel having an outer diameter slightly larger than the diameter of the openings 72, 74, 76 and 78. When driven into one of the openings 72, 74, 76 and 78, each pin 80 is elastically constricted and tends to expand outwardly to exert a frictional gripping force against the surrounding wall of the opening. The bores 70 in the wedge guides 12 are each of a diameter slightly greater than the diameter of the constricted pins 80 and receive the pins 80 with a slip fit to permit ready insertion and removal of the pins 80.

When a set of blades 14 is to be installed in the inserting apparatus 10, a pin 80 is inserted into a selected upwardly inclined opening such as opening 72 of each blade 14. Following retraction of the stripper 50 from the position shown in FIG. 1 to a lowered position within the housing member 18, the rear portions 22 of the blades 14 are placed within the circular array of wedge guides 12 with the projecting ends of the pins 80 in alignment with the respective selected bores 70 in the wedge guides 12. The blades 14 are then urged downwardly and radially outwardly to insert the pins 80 into the respective selected openings 70 of the wedge guides 12 and to seat the blades 14 upon the respective wedge guides 12. The stripper 50 may thereafter be returned to the position shown in FIG. 1 during subsequent operation of the inserting apparatus.

It is to be noted that during operation of the inserting apparatus 10, the stripper 50 may be retracted from the position shown in FIG. 1 to a lowered position where it is disengaged from the blades 14. In this lowered position of the stripper 50, the pins 80 are the sole means retaining the blades 14 on their respective wedge guides 12. Since the blades 14 must be mounted in cantilever fashion as shown in FIG. 1 with the forward portions 24 of the blades 14 each extending a substantial distance such as 15 centimeters or more beyond the portion fixed to the associated wedge guide 12 by a pin 80, it will be evident that a transverse force accidentally applied to the projecting end of a blade forward portion 24 during placement of a stator core 40 or coils 44 upon the blades 14 results in a substantially multiplied force at the adjoining portions of the blade 14 and the wedge guide 12 adjacent the pin 80. This separating force, being directed substantially perpendicularly to the longitudinal axes of a blade 14 and its associated wedge guide 12, is readily resisted by the obliquely extending pin 80 which acts as a wedge in opposition to the separating force. However, when replacement or readjustment of any blade 14 is required, the blade 14 may be readily separated from its associated wedge guide 12 by simply urging the blade 14 inwardly and upwardly in a direction generally parallel to the longitudinal axis of the bore 70 of the wedge guide 12 in which the fastening pins 80 of the blade 14 is installed.

In use of the coil and wedge inserting apparatus 10, it is generally necessary to increase or decrease the lengths of the portions 24 of the blades 14 extending from wedge guides 12 for insertion of coils 44 into stator cores 40 of different lengths. It will be evident that the lengths of the outwardly extending portions of the blades 14 may be readily changed in increments corresponding to the distance between adjacent bores 70 in the wedge guides 12 by inserting the pins 80 of the respective blades 14 into different selected bores 70. Since the distance between the openings 72 and 76 in each blade 14 is one and one-half times the distance between adjacent bores 70 in the wedge guides 12, the length of the outwardly extending portion of any blade 14 may be further changed a distance one-half the distance between the bores 70 by removing a pin 80 from the one of the openings 72 and 76 of the blade 14 in which it is inserted and placing it in the other of these openings. Thus, the length of the outwardly extending portion of any blade 14 can be accurately adjusted as required.

The relatively thin projections 36 on the forward portions 24 of the blades 14 are subject to damage by the stator cores 40 during use of the inserting apparatus 10 and commonly become worn or broken after a period of use. The blades 14 are each provided with the two pairs of openings 72, 76 and 74, 78 for permitting an end-to-end reversal of a blade 14 when one forward portion 24 is so worn or damaged.

While the invention has been described with reference to a particular embodiment, it is to be understood that this description is made by way of example and not as a limitation to the scope of the invention.

I claim:

1. In apparatus for inserting prewound coils and slot wedges into the slots of an internally slotted dynamoelectric machine stator core member, said apparatus comprising a base, a plurality of elongated, axially extending, parallel wedge guide members secured to said base and arranged in an annular array to define wedge guide passages therebetween, a plurality of elongated, axially extending, parallel blade elements respectively in axial and radial alignment with said wedge guide members to define an annular array of said blade elements coaxial with said array of wedge guide members, said blade elements having rear portions respectively abutting the inner surfaces of said wedge guide members and having forward portions projecting beyond said wedge guide members, the forward portions of selected adjacent ones of said blade elements defining coil accommodating spaces, the outer surfaces of said forward portions being contoured to engage a bore defining surface of a stator core member, stripper means axially movable within said array of blade elements for pushing prewound coils from said coil accommodating spaces into the slots of a stator core member, and means for pushing slot wedges from said wedge guide passages into the slots of a stator core member; the improvement for detachably retaining said blade elements respectively in axially and radially aligned engagement with said wedge guide members wherein each of said wedge guide members has at least one aperture formed in its inner surface extending obliquely at a predetermined angle relative to the longitudinal axis of the wedge guide member and each of said blade elements has at least one opening formed in its rear portion extending obliquely at said predetermined angle relative to the longitudinal axis of the blade element, and a retaining pin positioned in an obliquely extending opening of each said blade element and projecting into the obliquely extending aperture of a respective one of said wedge guide members.

2. The improvement of claim 1 wherein said obliquely extending apertures in said wedge guide members are each inclined in a direction extending inwardly of said array of wedge guide members and toward the forward portions of said blade elements.

3. The improvement of claim 2 wherein said predetermined angle is on the order of 45°.

4. The improvement of claim 2 wherein said retaining pins are longitudinally split sleeves of spring material elastically constricted when respectively positioned in said obliquely extending openings of said blade elements to exert a frictional gripping force against the surrounding wall of the respective opening, and said obliquely extending apertures in said wedge guide members are dimensioned to respectively receive said retaining pins with a slip fit.

5. The improvement of claim 4 wherein each of said wedge guide members has a plurality of said obliquely extending apertures formed in its inner surface for selectively receiving a respective one of said retaining pins, said apertures in each wedge guide member being aligned and uniformly spaced from one another lengthwise of said wedge guide member.

6. The improvement of claim 5 wherein each of said blade elements has at least two of said obliquely extending openings formed in its rear portion for selectively receiving a respective one of said retaining pins, said openings in each blade element being aligned and spaced from one another lengthwise of said blade element, adjacent ones of said at least two obliquely extending openings in each of said blade elements being spaced a distance on the order of one and one-half times the distance between adjacent ones of said obliquely extending apertures in each of said wedge guide members.

7. A blade element for use in short stroke coil and wedge inserting apparatus of the type wherein a plurality of blade elements are detachably retained upon respective wedge guide members for insertion of prewound coils into selected slots of a stator core member, said blade element comprising an elongated member of a generally tapered cross section having a longitudinally extending surface shaped at least at each end of said member for engagement with the inner end of the tooth of a stator core member, a portion of said longitudinally extending surface intermediate the ends of said elongated member being shaped for abutting engagement with an inner surface portion of a wedge guide member, said elongated member having first and second openings formed in said intermediate surface portion extending through said elongated member obliquely relative to the longitudinal axis of said elongated member at oppositely inclined like angles, said first and second obliquely extending openings being spaced respectively at substantially like distances from the respective ends of said elongated member, and said first and second obliquely extending openings each being dimensioned to receive a retaining pin for attachment of said elongated member to an associated wedge guide member.

8. The blade element of claim 7 wherein said first and second obliquely extending openings are each inclined in a direction extending inwardly of said intermediate surface portion and away from the respective closer end of said elongated member.

* * * * *